United States Patent [15] 3,701,854

Anderson et al. [45] Oct. 31, 1972

[54] KEY TELEPHONE SYSTEM CALL SIGNALING AND STATION SET DATA TRANSFER ARRANGEMENT

[72] Inventors: Harold Peter Anderson; Francis Michael Fenton, both of Boulder, Colo.

[73] Assignee: Bell Telephone Laboratories, Incorporated, Murray Hill, N.J.

[22] Filed: Dec. 21, 1970

[21] Appl. No.: 100,202

[52] U.S. Cl. ................................179/18 AD, 179/99

[51] Int. Cl. .............................................H04m 1/00

[58] Field of Search.........179/18 AD, 99, 37, 38, 39, 179/40

[56] References Cited

UNITED STATES PATENTS

| | | | |
|---|---|---|---|
| 3,604,857 | 9/1971 | Opferman | 179/99 |
| 3,603,737 | 9/1971 | LeDorh et al. | 179/15 AP |

*Primary Examiner*—Thomas W. Brown
*Attorney*—R. J. Guenther and James Warren Falk

[57] ABSTRACT

An electronic key telephone system is disclosed in which each key telephone set is equipped with a multifrequency call signaling push-button dial as well as a number of line pick-up keys. Regardless of the number of pick-up keys on a set, it is connected to the local key system via only a single pair of tip and ring conductors and a data link. The identity of an operated pick-up key is transmitted to the local key system over the data link. The multifrequency call signaling dial is modified to generate the normal multifrequencies and in addition is connected to a digital encoder to transmit the identity of an operated call signaling push button over the data link when a certain pick-up key is operated. The local telephone system thus may dispense with the need for analog tone signaling receivers and can employ the operated push buttons for call signaling purposes in the digital mode. The station user is assured that his call signaling push buttons are operating correctly when the set is transmitting digital call signaling information to the local key system because the side tones of the multifrequency signals will be audible.

13 Claims, 5 Drawing Figures

INVENTORS H. P. ANDERSON
F. M. FENTON
BY
ATTORNEY

KEY TELEPHONE SYSTEM CALL SIGNALING AND STATION SET DATA TRANSFER ARRANGEMENT

BACKGROUND OF THE INVENTION

This invention relates to telephone switching systems and more particularly to the simplification of call signaling in small private branch exchanges and key telephone communications systems.

Recently the telephone industry has seen a resurgence of effort directed to improving key telephone station systems. This effort has involved the modernization of station set equipments and the reduction in the amount, and complexity of initial cabling required as well as the amount of alteration required to be performed as customers move. Renewed attention has also been given to the provision of additional services for key system users. For example, the copending applications of F. M. Fenton entitled "Key Telephone System Link Switching Network" Ser. No. 60,505, filed Aug. 3, 1970, now U.S. Pat. No. 3,668,289, and F. M. Fenton entitled "Busy and Talking Link Allotter For Electronic Key Telephone System" Ser. No. 100,311 filed of even date herewith disclose key telephone systems wherein intercom service, one of the expanded service features desired by key telephone system users, is facilitated through improvements in power supply and link allotter circuitry, respectively.

It has occurred to the present inventors that such additional services could be more readily accommodated if it were possible to employ key telephone sets having multifrequency call signaling push-button dials for transmitting the call signaling information to designate a local station for connection via the intercom or conferencing link. Such sets equipped with multifrequency tone generating push buttons such as the TOUCH-TONE sets manufactured by the Western Electric Company are becoming increasingly more popular both with customers and with telephone operating companies. These sets can be dialed faster and can transmit call signaling information to the central office over a greater loop range and under more severe interference conditions than conventional rotary dialing equipment. On the other hand, considerably more complex receiving equipment must be provided to utilize the information so generated. When a set equipped with a multifrequency call signaling dial is served by a central office or large PBX, the expense of the necessary multifrequency receiving equipment can be amortized over the large number of telephone lines involved. Because of the expensive analog receivers required, it has not heretofore been economical in small PBXs and local key systems to employ the multifrequency push buttons for local call signaling purposes.

Accordingly, it is an object of the present invention to provide an arrangement by means of which the push-button array of a multifrequency signaling telephone set may be employed for local call signaling purposes in small PBXs and key systems without the need for local multifrequency receivers.

It is another object of the present invention to permit such local call signaling without interference to the manner in which such sets transmit multifrequency call signaling information on central office calls.

SUMMARY OF THE INVENTION

The foregoing and other objects of our invention are achieved in one illustrative embodiment wherein the push-button unit of a multifrequency tone telephone set is modified to permit a key button, when depressed, to generate both the usual multifrequency signals as well as a distinct pattern of digital signals. In the illustrative embodiment of our invention, such a set is employed in an electronic key telephone system in which each telephone set is provided with data link access to the local key system network for transmitting data to control the connection of the set's talking path conductors to the line designated by the operated one of the set's pick-up keys and for returning to the set the audible and visual data corresponding to the state of the lines to which the set has access. In accordance with our invention the call signaling push buttons of the set when so modified may be employed together with the line or service pick-up keys to increase the number of functions capable of being controlled by the set. When a selected pick-up key, such as the one for intercom service, is operated, the identity of the key is encoded in digital form, entered into a station set shift register, and transmitted over the data link to condition the local key system to operate the intercom switching network. Thereafter, the key system returns dial tone over the tip and ring conductors to the station set and the station set user may operate the call signaling push buttons to designate the local station desired to be called. The identity of the operated call signaling push button is encoded and entered into the same station set shift register priorly used to transmit pick-up key information to the local key system. Operation of a call signaling push button also generates the conventional multifrequency tone signals which are rendered audible to the station set user over the side-tone circuits of the station set's voice network so that the station user will hear the same handset signals that are normally associated with the use of the call signaling push buttons.

Additionally, in accordance with an aspect of our invention, the conventional multifrequency tone signals which are generated together with the digital signals may be utilized for signaling through a central office wherein the conventional multifrequency tone receivers may economically be provided. Accordingly, multifrequency call signaling equipment in accordance with our invention may be employed both for normal outgoing calls through a central office and for the interconnection of station sets within the key telephone system itself.

DESCRIPTION OF THE DRAWING

The foregoing and other objects and features of the invention may be more clearly understood from a reading of the following description of the illustrative embodiment together with the drawing in which:

FIGS. 2, 3 and 4 are connected.

GENERAL DESCRIPTION OF FIG. 1

Figures 1, 5:
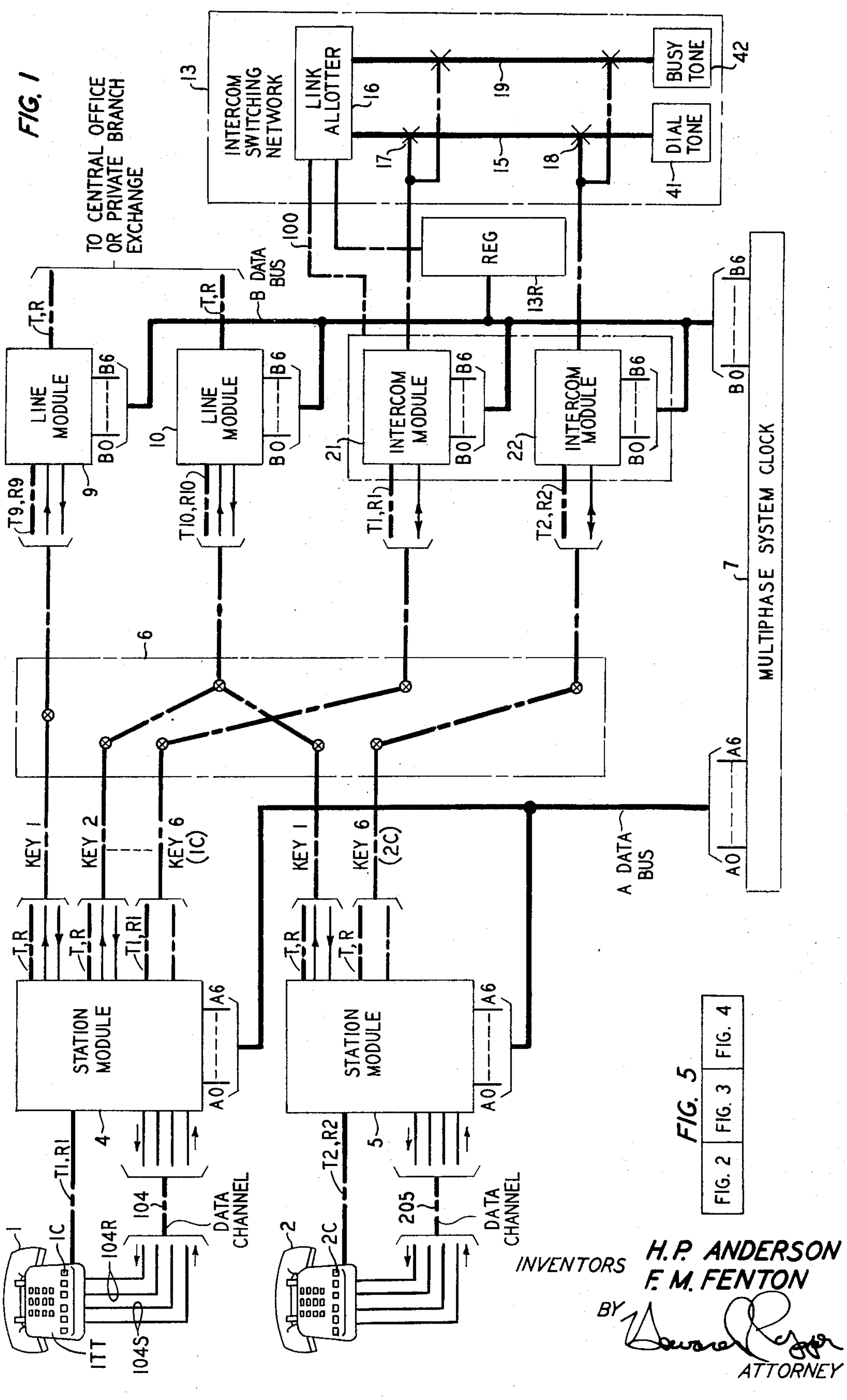
FIG. 1 shows a block diagram of an electronically controlled key telephone system in which the digital call signaling transmission arrangement of the present invention may be employed.
FIG. 5 shows how

FIG. 1 shows an illustrative electronically controlled key telephone system in which the call signaling arrangement of the present invention may be employed. An example of the key system in which our invention may be employed is described in the copending applications of D.J.H. Knollman and J.L. Simon Ser. No. 43,812 filed June 5, 1970, now U.S. Pat. No. 3,671,942, entitled "A Modular Key Telephone System Having a Distributed Processor Organization"; the copending application of D.J.H. Knollman Ser. No. 726,062 filed May 2, 1968, now U.S. Pat. No. 3,549,820 issued on Dec. 22, 1970 entitled "Key Telephone Station Concentrator"; and the copending application of F. M. Fenton Ser. No. 100,311, filed of even date herewith.

In the illustrative key telephone system, each of a plurality of key telephone sets 1, 2 is associated with a respective station module 4,5. Regardless of the number of pick-up keys with which the key telephone set may be equipped only a six-conductor cable need be run from its respective, centrally located station module 4, 5. Thus, station set 1 connected to its respective station module 4 over a six-conductor cable comprising the two conductors T1, R1 of the talking path and the four conductors of the data channel 104. Station set 1 is equipped with a call signaling push-button array 1TT and a plurality of line pick-up keys for accessing lines to the central office and a key 1C for accessing the local intercom switching network 13. The identity and status of any station set pick-up key may be transmitted from a station set to its associated station module over one pair of leads 104S in the data cable 104 and information from the respective station module necessary to control the illumination of pick-up keys and corresponding to off-hook, ringing or held lines transmitted over the other pair 104R of data leads.

EAch station module is cross connected via cross-connection field 6 to the line modules or service modules necessary to accord the station set access to the desired services. For example, station module 4 associated with station set 1 is shown as being cross connected in cross-connection field 6 to line module 9 for according station set 1 pick-up key access to a central office line that may be accessed by the station user depressing key 1. Similarly, station module 4 is cross connected to line module 10 to accord the station user access to a separate central office line through the operation of key 2. The right-most or sixth pick-up key of station set 1 identified as key 1C is cross connected in field 6 to intercom module 21 so that, as described in the last above-mentioned copending application of F. M. Fenton, the station user at station set 1 may operate intercom switching network 13 to establish a local intercom connection to one of the other station sets such as station set 2. As described in the above-mentioned Knollman-Simon application, the station modules 4, 5 receive control information from a multiphase system clock 7 over a bus shown herein as the A data bus while the line modules 9, 10 and service modules, such as the intercom modules 21, 22 described in the above-mentioned F. M. Fenton application, receive control signals from multiphase system clock 7 over the leads of the B data bus.

When the key system customer at station set 1 desires to initiate an intercom call, he removes the handset from the switchhook cradle and depresses the sixth pick-up key 1C for intercom service. The off-hook state of the station and the identity and state of the sixth key button are entered into a station set shift register, shown in detail in FIG. 2, and forwarded to station module 4 over the transmit conductors 104S of data channel 104. Station module 4 recognizes the data received and applies a signal to an appropriate conductor in cross-connection field 6 to alert intercom module 21 of the request for access to the local intercom switching network 13. Intercom module 21 signals link allotter 16 in intercom switching network 13 to seize a register 13R. The register causes dial tone to be returned over the tip and ring conductors T1, R1 to the receiver of station set 1. When the station user hears dial tone, he may then operate the call signaling push button array 1TT to designate the called station with whom communication is desired. In accordance with our invention, the identity of the operated call signaling push-button is entered into the same station set shift register (FIG. 2) priorly used to encode the state and identity of any of the operated ones of the line or special service pick-up keys, such as pick-up key 1C operated for accessing intercom switching network 13. Advantageously, the normal multifrequency tone generating equipment with which the station set 1 is equipped will also be operated so that the station user will hear the normal multifrequency tones associated with the operation of the call signaling push-buttons over the station set's conventional side-tone circuits. However, it is a feature of our invention that the transmission of digitally encoded call signaling information for local purposes completely eliminates the need to provide the complex multifrequency tone receivers normally required to receive information keyed by call signaling push-buttons.

To reduce the number of conductors required for cross-connecting a station module such as station module 4 to its intercom module such as intercom module 21, a common conductor is used to transmit both the request for intercom service and the subsequent digitally encoded call signaling information. In addition, the same conductor is used in the reverse direction to transmit from the intercom module to the station module the fact that the called station is being rung. The multiple of use of this single conductor in cross-connection field 6 between a station module and its associated intercom module is made possible by the different time slots provided by the B data bus as well as certain detailed circuitry within the intercom module hereinafter to be described in detail.

When the station set user desires to make an outgoing call via the telephone central office he depresses key 1 or key 2 to access the central office lines associated with line modules 9 or 10, respectively. The multifrequency call signaling equipment in station set 1 will operate in the conventional manner to transmit the combinations of alternating frequency tones to the remote central office. In this manner, our invention permits multifrequency tone signaling to be used when calls are made through the central office and to be used for assuring the station user that his call signaling push-buttons are operating correctly when the station set push-buttons transmit the otherwise inaudible digital signals to the local intercom network.

DETAILED DESCRIPTION

Figure 2:
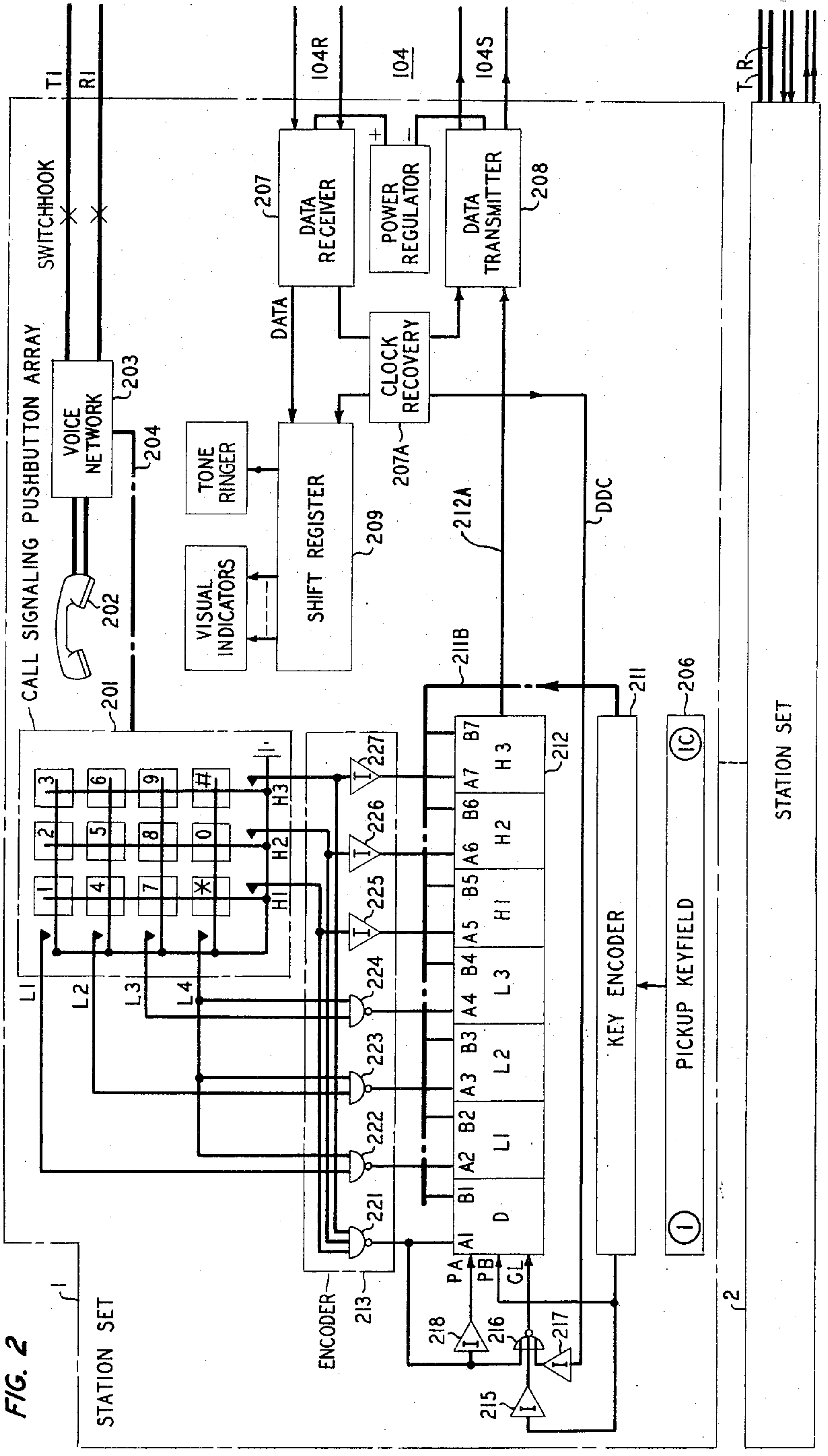
FIG. 2 shows a key telephone set having call signaling push buttons and arranged according to our invention to transmit local call signaling information over a data link.

Referring now to FIG. 2 the modified multifrequency tone signaling key telephone set of the present invention is shown. Set 1 comprises a multifrequency call signaling push-button array 201, a plurality of line or special service pick-up keys in key field 206, a handset 202, and voice network 203. The voice network is connected to the call signaling push-button array over a cable 204 so that the operation of any of the call signaling push buttons will cause the usual pairs of audio frequencies to be generated. Details of the connections of call signaling push-button array 201 to voice network 203 and the details of the manner in which pairs of alternating-current tone frequencies are generated by the operation of each of the push buttons being well known are omitted from the drawing. It should be appreciated, however, that whenever one of the call signaling push buttons is operated a distinctive tone will be heard in the receiver of handset 202.

Figure 3:
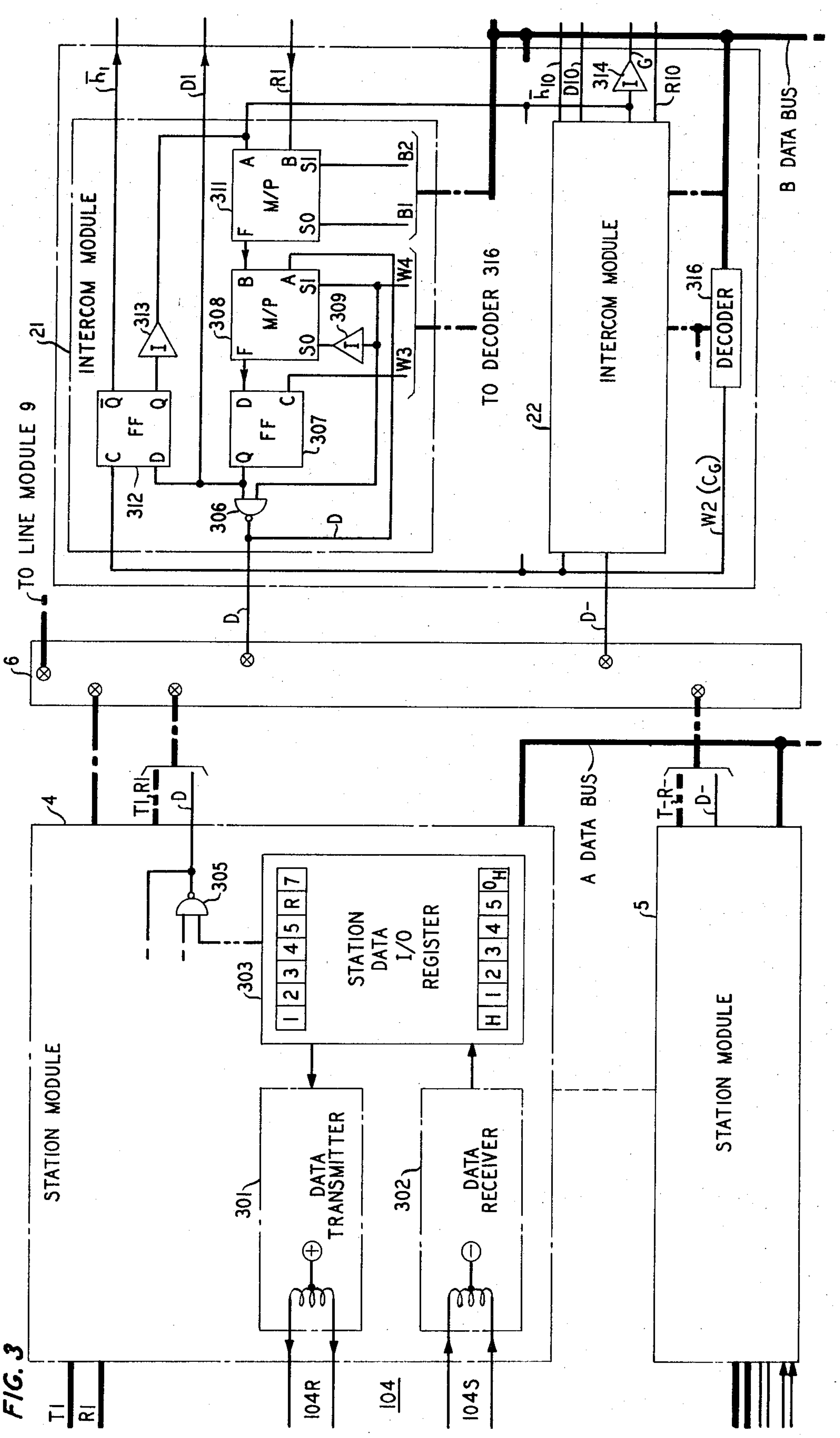
FIG. 3 shows the station module and an intercom module for receiving the local call signaling information.

Station set 1 is connected to station module 4 in FIG. 3 by conductors T1 and R1 which provide the talking path and by conductors 104R and 104S which provide a two-way transmission link between station set and station module. The digital information sent over data link 104 from station set 1 to station module 4 in the above-mentioned applications consisted of the encoded state of the station set switchhook and of any of the operated keys in pick-up key field 206. The digital information transmitted from station module 4 to station set 1 comprised the signals for operating the pick-up key lamps and the tone ringer of the station set in accordance with our invention. The information transmitted from station set 1 to station module 4 would also include the identity of the operated push buttons in call signaling push-button array 201 when pick-up key 1C is operated to access local intercom switching network 13. The manner in which data transmitter 301 and data receiver 302 operate with respect to data link 104 and station data input-output register 303 having been described in various of the above-mentioned copending applications will not be repeated at length herein. Briefly, however, data transmitted by data transmitter 208 of station set 1 to data receiver 302 of station module 4 over leads 104S and data transmitted by data transmitter 301 of station module 4 to data receiver 207 of station set 1 over leads 104R will normally be transmitted in bipolar ac pulse form. The respective data receiver and data transmitter then convert the pulse form into a unipolar pattern capable of being registered in the respective shift register 209 of the station set and input-output register 303 of the station module.

As described in the above-mentioned copending application of Knollman-Simon, the station module will be cross connected to a number of different line modules to give the station pick-up key access to different central office lines. When, for example, pick-up key 1 of station set 1 is operated, station module 4 will activate its cross connection to line module 9, FIG. 1, responsive to the identity of pick-up key 1 being registered first in station set shift register 212 and then being outpulsed over the data link to station data input-output register 303 of station module 4. Thereafter the station user may make a central office call by operating the call signaling push buttons 201 in the normal manner. The tone signals generated by dial 201 will be delivered over cable 204 to voice network 203 where they will be forwarded by side-tone circuit to the receiver of handset 202 and by other conventional coupling circuits to leads T1 and R1 towards station module 4 in FIG. 3. Through means not shown in detail in the drawing but described in the above-mentioned Knollman-Simon application, station module 4 provides a path for these call signals to cross-connection field 6 and line module 9. The remainder of the circuitry of FIGS. 2, 3, and 4 will now be described for the conditions established when station set 1 initiates an intercom call.

Intercom Call

When the station set user desires to initiate a telephone call to one of the other key telephone stations accessible over intercom switching network 13, he removes handset 202 from the switchhook cradle and depresses pick-up key 1C in pick-up key field 206. The identity of the operated pick-up key is encoded by key encoder 211 and an encoded pattern of signals is applied to cable 211B. Simultaneously, key encoder 211 applies a low signal to lead PB to permit the parallel entry into register 212 of the encoded pattern appearing on cable 211B. While pick-up key 1C is depressed, inverter 215 applies a high signal to NOR gate 216 to block the read clock pulses appearing on lead DDC. When pick-up key 1C is released, NOR gate 216 is unblocked. The contents of station shift register 212 are read out under the control of clock signals applied by clock recovery circuit 207A to lead DDC. Circuit 207A derives the clock signals from the waveform of the data signals received by data receiver 207 over data leads 104R from data transmitter 301 in the station module. The clock signals applied to lead DDC are inverted by inverter 217 and applied to NOR gate 216 as a sequence of low signals.

The contents of shift register 212 are accordingly serially delivered via lead 212A to data transmitter 208 which forwards the digital information, in suitable form for transmission over data conductors 104S, to station module data receiver 302. Data receiver 302 converts the signals received over conductors 104S into a suitable form for entry into the lower register of station data input-output register 303. The contents of the lower register of register 303 are translated by circuitry in station module 4, not shown, into a signal representative of a request for intercom service which signal is applied to lead D toward intercom module 21. The service request may, for example, be transmitted to intercom module 21 as described in the last above-mentioned copending application of F. M. Fenton. In that application, the intercom module received intercom service request information from the station module when four different leads of the B data bus, defining four different intervals of time, were energized. An alternative form of intercom module is shown in FIG. 3 of the instant application according to which module 21 is adapted (a) to receive the intercom service request from station module 1 during one interval of time defined by decoder 316 decoding a particular word on the B data bus, (b) to receive dial data from station module 1 during another interval of time and, (c) to transmit ringing information to station set 1 during still another time interval. The manner in which the intercom and station modules exchange information will be described hereinafter in more complete detail.

Continuing now with the description of the manner in which the station module makes known its intercom service request to its associated intercom module, the registration of the identity of the active state of key 1C in the lower register of register 303 is translated by circuitry, not shown, of station module 4 into a high signal at the lower input of NAND gate 305. The upper input of NAND gate 305 is provided with a high signal by the output of a station module decoder (not shown) connected to the A data bus which is similar to intercom module decoder 316 connected to the B data bus. The coincident occurrence of the high signals at the two inputs of NAND gate 305 causes a low signal to appear at the output of NAND gate 305 which is connected to lead D. The other end of lead D is cross connected in cross-connection field 6 to the D lead of intercom module 21 which is connected to the output of NAND gate 306. In accordance with the embodiment shown in FIG. 3, both NAND gates 305 and 306 are advantageously "bare collector" NAND gates, that is, they do not contain an active pull-up transistor in their output stages. Accordingly, the outputs of the two NAND gates 305 and 306 may be directly connected together without danger of damage.

The purpose of employing bare collector NAND gates is to allow the D lead to be placed in the low signal state condition by the output of one of NAND gates 305, 306 when the signals applied to the inputs of the other of the NAND gates would normally maintain the D lead in the high signal state. The time during which this signaling occurs is determined by the time at which information is presented to the A and B data buses by clock 7, FIG. 1. Thus, at the same time that information on the A data bus is decoded by station module 4 to apply a high signal to the upper input of NAND gate 305, information on the B data bus is decoded by decoder 316 to apply a low signal to lead W4 connected to the lower input of NAND gate 306. It will be recalled that a NAND gate is a circuit device which provides a high at its output when any of its inputs is provided with a low signal. Accordingly, the time interval defined by the A data bus causing a high signal to be applied to the upper input of NAND gate 305 and the B data bus providing a word to decoder 316 that provides a low input to the lower input of NAND gate 316 is a time interval during which station module 4 may transmit the request for intercom service to intercom module 21.

The low signal appearing on lead W4 and applied to the lower input of NAND gate 306 would normally cause the output of NAND gate 306, i.e., lead D, to be placed in the high signal condition. However, the two high signals appearing at the inputs of NAND gate 305 cause lead D to assume the low signal condition and, accordingly, the low signal condition prevails. The low signal appearing on lead D is connected to the A input of multiplexer 308. Multiplexer 308 as well as multiplexer 311 are logical devices which behave according to the following Table:

TABLE I

| SO | S1 | F |
|---|---|---|
| 0 | 0 | B |
| 0 | 1 | B |
| 1 | 0 | $\bar{A}$ |
| 1 | 1 | 1 |

With decoder 316 applying a low signal to lead W4, multiplexer 308 has a low signal applied to its input S1 and a high signal applied to its input SO. The latter occurring because inverter 309 inverts the signal appearing on lead W4. Under these circumstances Table I shows that a high signal appears at the F output of multiplexer 308. Accordingly, the service request transmitted by station module 4 has been received in multiplexer 308 of intercom module 21.

Flip-flop 307 is connected to be set by the output state of multiplexer 308 when an appropriate clock pulse is applied to lead W3 by decoder 316. The high signal applied to the D input of flip-flop 307 causes a high signal to appear at the Q output of the flip-flop when the clock pulse is applied to the C input of the flip-flop. The high signal at the Q output of flip-flop 307 is connected to the D input flip-flop 312 which is set when decoder 316 applies a clock pulse to its C input. The setting of flip-flop 312 causes a low signal to appear at its $\bar{Q}$ output to which lead $\bar{h}_1$ is connected. The low signal on lead $\bar{h}_1$ indicates that station set 1 is in the off-hook condition. The high signal appearing at the Q output of flip-flop 312 is inverted by inverter 313 and is applied to the input of common group inverter 314. Output lead G at the output of common group inverter 314 is thus placed in the high signal state and will remain in the high signal state as long as any of the key telephone sets 1, 2 is in the off-hook state after having depressed its intercom pick-up key.

Figure 4:
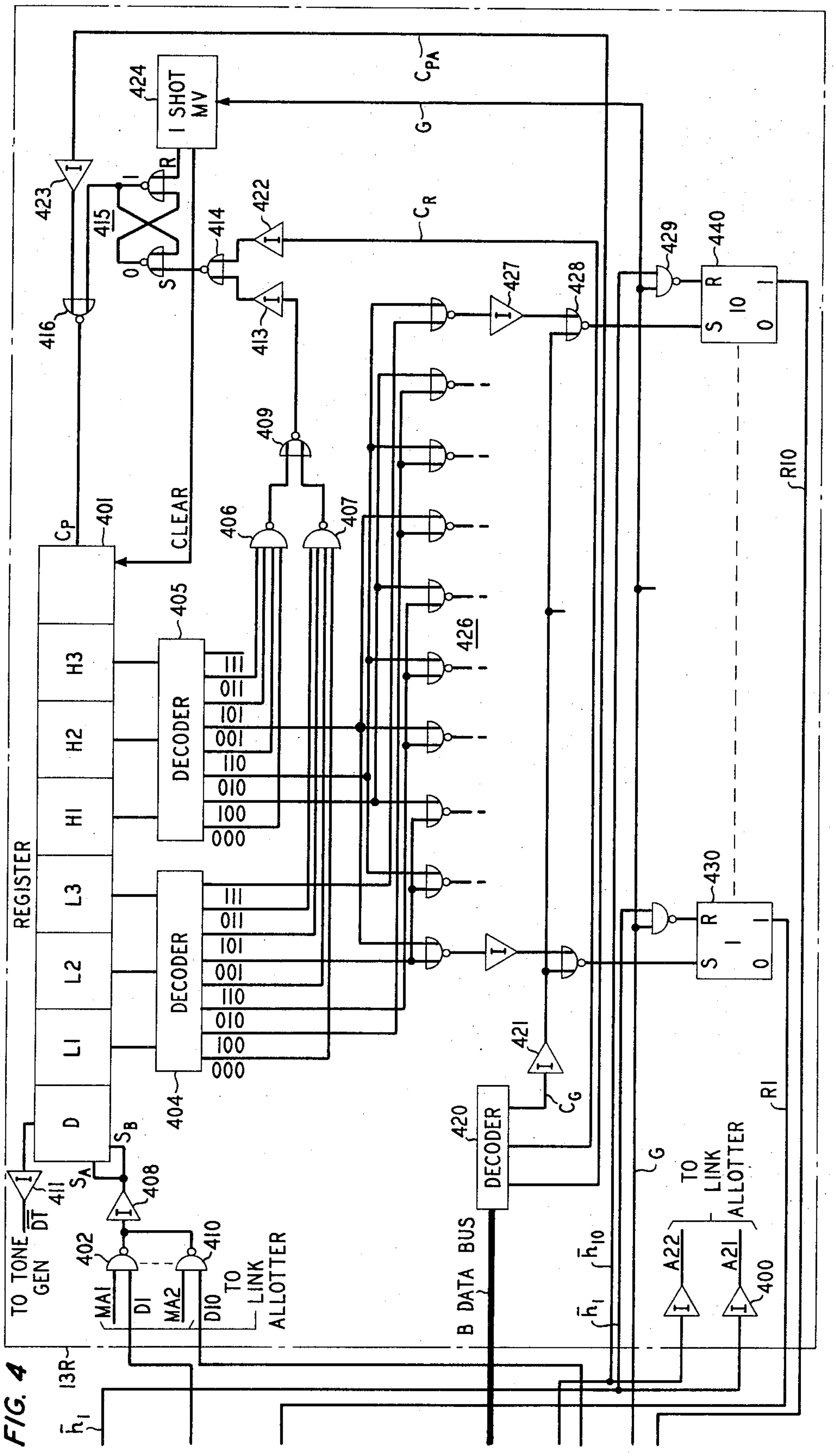
FIG. 4 shows a register for decoding the local call signaling information transmitted over the data link by the station set of FIG. 2.

The low signal appearing on lead $\bar{h}_1$ is inverted by inverter 400 and, as shown in FIG. 4, is connected to the link allotter 16 as signal A21. The high signal appearing on lead A21 may then be employed as described in the last-mentioned copending application of F. M. Fenton to cause link allotter 16 to connect dial-tone generator 41 and the tip and ring conductors T1, R1 of intercom module 21 to the talking link. Dial tone is, accordingly, conveyed to the receiver of handset 202 of station set 1, FIG. 2.

When the station user at station set 1 hears dial tone, he will operate one of the call signaling push buttons of push-button array 201. The operated call signaling push button via conventional work contacts, not shown, closes circuits, not shown, associated with the push-button array for generating a pair of ac tones corresponding to the operated push button. These tones are delivered over cable 2-4 in the usual manner to voice network 203. Voice network 203 includes a conventional side tone circuit so that the tones will be audible in the receiver of handset 202. However, the call signaling pushrbutton array is modified in accordance with our invention by the inclusion of the crosspoint levers L1 through L4 and H1 through H3 so that an additional crosspoint at the intersection of the appropriate one of these levers will also be made when a push button is operated. For example, if the station user depresses key button 2, ground potential will be applied to horizontal crosspoint lever L1 and vertical crosspoint lever H2. The grounds applied to the crosspoint levers L1 through L4, H1 through H3 appear as ground or low-signal inputs to push button encoder 213. The ground appearing on lever L1 is applied to an input of NAND gate 222 while the ground appearing on lever H2 is applied to an input of NAND gate 221 and to the input of inverter 226. These low input signals cause high signals to appear at the outputs of NAND gates 222, 221 and inverter 226. The high signals at the outputs of NAND gate 221 and 222 and inverter 226 apply binary "1" signals to stages D, L1 and H2, respectively, of register 212. The operation of any of the push buttons will be seen to always cause a ground to be applied to one of the inputs of NAND gate 221 and to one of the inputs of inverters 225 through 227 of encoder 213. Similarly, a ground applied to one of levers L1 through L4 will cause a ground signal to be applied to one of the inputs of NAND gates 222 to 224, respectively, of encoder 213. The operation of a push button in call signaling push-button array 201 is thus encoded by encoder 213 according to the following scheme:

TABLE II

| Digit | Code | L1 | L2 | L3 | H1 | H2 | H3 |
|---|---|---|---|---|---|---|---|
| 1 | | 1 | 0 | 0 | 1 | 0 | 0 |
| 2 | | 1 | 0 | 0 | 0 | 1 | 0 |
| 3 | | 1 | 0 | 0 | 0 | 0 | 1 |
| 4 | | 0 | 1 | 0 | 1 | 0 | 0 |
| 5 | | 0 | 1 | 0 | 0 | 1 | 0 |
| 6 | | 0 | 1 | 0 | 0 | 0 | 1 |
| 7 | | 0 | 0 | 1 | 1 | 0 | 0 |
| 8 | | 0 | 0 | 1 | 0 | 1 | 0 |
| 9 | | 0 | 0 | 1 | 0 | 0 | 1 |
| 0 | | 1 | 1 | 1 | 0 | 1 | 0 |
| * | | 1 | 1 | 1 | 1 | 0 | 0 |
| # | | 1 | 1 | 1 | 0 | 0 | 1 |

While the particular code selected to represent by binary signals the operation of a particular push button in call-signaling array 201 is not of critical importance, the code shown in Table II offers some advantages. It is a Hamming code which makes error detection somewhat simpler because adjacent digits are represented by binary patterns which differ by bit values in at least two bit positions. Accordingly, error-detection circuitry associated with station data input-output register 303 of station module 4 may detect errors in transmission of the digital information from register 212 to the station module. Such error-detection circuitry, which is not shown in detail, in the station module, would be similar to the error-detection circuitry associated with register 401 of FIG. 4.

At the same time that the binary outputs of encoder 213 are applied to the various stages of station shift register 212, the high signal output of NAND gate 221 of encoder 213 is applied as an input to NAND gate 216 and to inverter 218. The output of inverter 218 is connected to input PA of register 212 to allow the parallel entry of the encoded push-button dial identity provided by encoder 213. It will be noted that the signal at the output of NAND gate 221 persists only during the short time interval that the station user maintains the particular push button depressed. When the station user allows the call signaling push button to return to its normal position, the output of NAND gate 221 returns to its low signal state. The low signal at the output of gate 221 is applied to enable NOR gate 216 to pass the clock pulses applied by clock recovery circuit 207A to lead DDC through inverter 217 and thereby to the CL shift signal input of shift register 212. The clock pulse applied to input CL serially shifts out the contents of register 212 to data transmitter 208.

Data transmitter 208 converts the digital signals to a form suitable for transmission over conductors 104S of data link 104 towards station module 4 in FIG. 3. Data receiver 302 in station module 4 receives the encoded contents of shift register 212 identifying the operated call signaling push button in the same manner as it received the identity of the priorly operated pick-up key 1C. In similar fashion, station data input-output register 303 receives the digital representation of the operated call signaling push button and, during the occurrence of a predetermined word appearing on the A data bus, causes the contents of the lower shift register of input-output register 303 to be shifted out through NAND gate 305 and applied to lead D towards intercom module 21.

Each time a binary "1" is shifted out of the lower shift register of input-output register 303, it is applied by NAND gate 305 as a low signal to the D lead. The low signal on the D lead is applied to the A input of multiplexer 308 which places a corresponding high signal at its F output. The F output of multiplexer 308 sets flip-flop 307 when flip-flop 307 receives a clock pulse on lead W3.

When flip-flop 307 is set, its Q output applies a high signal to lead D1 toward register 13R, FIG. 4. The high signal on lead D1 is applied to the lower input of NAND gate 402 in register 13R. The upper input of gate 402 is connected to lead MA1 of link allotter 16. The manner in which link allotter 16 energizes lead MA1 is disclosed in the last above-mentioned copending application of F. M. Fenton.

The first bit at the output of NAND gate 402 is entered into the left-most or D stage of register 401 when clocking lead $C_p$ is energized. Lead $C_p$ is energized when decoder 420, decoding a word from the B data bus, energizes lead $C_{PA}$. The signal on lead $C_{PA}$, inverted by inverter 423 is applied as a low signal to the upper input of NOR gate 416. If flip-flop 415 is reset, a low signal will also be applied to the lower input of NOR gate 416 allowing the clock pulse to be applied to register 401.

The first binary bit of the code pattern which is a binary "1" that is entered into stage D will cause a low signal to appear on lead $\overline{DT}$ interrupting dial tone. The manner in which dial tone is applied to the tip and ring conductors T1, R1 of the calling telephone is also described in the above-mentioned copending application of F. M. Fenton. As the binary pattern is shifted through stage D, each binary "0" will restore dial tone.

However, since the binary pattern is pulsed into register 401 over lead D1 on successive energizations of lead W3, FIG. 3, at a rate such that each binary bit occupies approximately two microseconds, the removal of dial tone by the first binary "1" will not be noticed by the calling subscriber. However, as shown in the lower register of station data input-output register 303 of FIG. 3 the seventh and last bit to be transmitted from register 303 to register 401 is the off-hook status bit OH. Assuming that calling station 1 is off-hook just prior to the completion of outpulsing, the off-hook bit will be a "1" and stage D of register 401 will contain this bit at the conclusion of dialing. Accordingly, dial tone will finally be retired when register 401 is properly loaded.

The bits in the lower register of 303 are shifted into register 401 via lead D, intercom module 21 and lead D1. Each bit is shifted out of register 303 responsive to the decoding of a word on the A data bus which occurs simultaneously with the energization of lead W4 by decoder 316 of module 21 decoding a word from the B data bus. The state of the D lead connecting station module 4 and intercom module 21 is entered into the A input of multiplexer 308 and as before, flip-flop 307 will be set when decoder 316 energizes lead W3.

Once again, lead D1 to register 13R, FIG. 4, will be energized to reflect the state of the binary bit outpulsed by input-output register 303 to intercom module 21. The information on lead D1 is applied to stage D of register 401, FIG. 4, via NAND gate 402 which remains energized by lead MA1. Thereafter, decoder 420 once again energizes lead $C_{PA}$ to shift the contents of the register one stage to the right.

Decoders 404 and 405 are associated with stages L1 through L3 and H1 through H3 of register 401. Decoder 404 is wired to detect all of the possible patterns of binary bits in stages L1 through L3. If any of the patterns 000, 011, 101, or 110 appear in stages L1 through L3, decoder 404 applies a low signal at its correspondingly numbered output lead to NAND gate 407. Reference to Table II, above, shows that the foregoing codes are not valid codes for these stages of register 401. Accordingly, so long as decoder 404 detects any of those nonvalid codes, it will cause NAND gate 407 to apply a high signal to the lower input of NOR gate 409. Similarly, if decoder 405 detects any of the nonvalid codes 000, 011, 101 or 110 in stages H1 through H3 of register 401, it will apply a low signal to one of the correspondingly numbered inputs of NAND gate 406 which, in turn, will apply a high signal to the upper input of NOR gate 409. NOR gate 409 responds to the application of a high signal at either of its inputs by applying a low signal at its output. Inverter 413 inverts the output of NOR gate 409 and applies a high signal to the left-hand input of NOR gate 414. The high signal at the left-hand input of NOR gate 414 prevents the subsequent clock signal appearing on lead $C_R$ from setting flip-flop 415. So long as flip-flop 415 remains reset, the clock pulses that are applied to lead $C_{PA}$ will be enabled to pass through NOR gate 416. Accordingly, the contents of register 401 will continually be shifted to the right until decoders 404 and 405 no longer detect invalid codes.

When decoders 404 and 405 detect valid codes in their respective stages of register 401, no low input signals will be applied to NAND gates 406 and 407. Accordingly, the output of NOR gate 409 will be in the high signal condition and inverter 413 will apply a low signal to the left-hand input of NOR gate 414. When decoder 420 subsequently energizes lead $C_R$, the right-hand input of NOR gate 414 will be provided with a low signal by inverter 422. The output of NOR gate 414 will then set flip-flop 415 causing NOR gate 416 to be blocked.

With a valid code registered in register 401 and clock pulses $C_{PA}$ blocked by the set condition of flip-flop 415, the valid code output leads of decoders 404 and 405 will energize both inputs of one of the plurality of NOR gates 426. Let it be assumed that the code 111 010, has been registered in register 401. The right-most one of NOR gates 426 will have low signals applied at both of its inputs causing a high signal to be applied to inverter 427. Subsequently, decoder 420 decodes a word from the B data bus which causes it to energize lead CG. The signal appearing on lead CG inverted by inverter 421 is applied to the left-hand input of NOR gate 428. NOR gate 428 then applies a high signal to the set input of flip-flop 440. Flip-flop 440 in the set condition applies a high signal to lead R10. The high signal on lead R10 is a ringing control signal which is applied to intercom module 22 in FIG. 3. Intercom 22 contains circuitry similar to that shown for intercom module 21. The high signal appearing on lead R10 is transmitted by intercom module 22 over lead D– to station module 5 under control of signals appearing on the B data bus. These signals together with signals from decoder 316 control multiplexers, flip-flops, and a NAND gate in intercom module 22 which are similar to the multiplexers, flip-flops and NAND gate shown in detail for intercom module 21. As was stated in connection with the detailed description of intercom module 21, the flip-flops, bare collector NAND gate, and multiplexers enable a single "D" lead interconnecting a station module with its associated intercom module to carry call signaling information and to carry supervisory signals in both directions. The passage of a supervisory, i.e., intercom service request signal from the station module to the intercom module and the passage of call signaling information from the station module to the intercom module have already been described. The application of a high signal on lead R10 of intercom module 22 causes supervisory, i.e. ringing control information to be transmitted in the reverse direction, i.e., from intercom module to station module over a "D" lead.

To render the drawing less complex, the NAND gate flip-flops and multiplexers of module 22 have not been shown in detail. However, the operation of the circuitry in module 22 responsive to the appearance of the ringing control signal on lead R10 may be understood by considering the drawing as if the detailed circuitry shown in intercom module 21 were also shown in detail from module 22. Thus, the high signal appearing on lead R10 is received at the B input of the multiplexer in intercom module 22 corresponding to multiplexer 311 of module 21. During the occurrence of a predetermined word on the B data bus, leads B1 and B2 of this multiplexer are energized. These leads are connected to the S0 and S1 inputs of the multiplexer corresponding to multiplexer 311. Reference to Table I shows that when S0 = 0 and S1 = 1 the F output of the multiplexer reflects the state of the signal at its B input. Subsequently, decoder 316 energizes lead W4 causing the multiplexer in module 22 corresponding to multiplexer 308 to deliver what is presented at its B input to its F output. Accordingly, the multiplexer corresponding to multiplexer 308 presents at its F output the ringing control information pertaining to lead R10. During a further subsequent input decoder 316 energizes lead W3 to clock the flip-flop of module 22 corresponding to flip-flop 307 of module 21. When so clocked, this flip-flop presents at its Q output the lead R10 ringing control information delivered to its D input by the multiplexer corresponding to multiplexer 308. Assuming that the ringing control information applied to lead R10 was a high signal, the NAND gate of module 22 corresponding to NAND gate 306 of module 21 will receive a high signal at its upper input. During a subsequent interval, decoder 316 will apply a high signal to lead W4. Accordingly, the NAND gate in module 21 corresponding to NAND gate 306 will have high signals at both of its inputs thereby causing lead D- toward station module 5 to be in a low signal condition. The low signal state on lead D– detected by circuitry in station module 5 and applied as a bit of predetermined value in the R stage of the upper register of a station data input-output register in module 5 corresponding to the R stage in the upper register of station data input-output register 303 of station module 4. The contents of the input-output register in station module 5 is shifted out to its data transmitter corresponding to data transmitter 301 which in turn sends the ringing control information over data leads corresponding to leads 104R. Station set 2 then receives the ringing control information and activates its tone ringer and visual indicators for the intercom pick-up key corresponding to key 1C of station set 1.

Ringing control flip-flop 440 which was set by the output of decoders 404 and 405 is reset at the completion of conversation between stations 1 and 2. Under these circumstances, lead $\overline{h_{10}}$ will be in the low signal state. Lead G at the output of common group inverter 314 in FIG. 3 will be in the low signal state only when all stations have returned to the on-hook condition. Under these circumstances, NAND gate 429 will apply a high signal to the R input of a ringing control flip-flop 440. Ringing control flip-flop 440 will be reset removing the ringing control signal from lead R10.

Accordingly, we have shown an electronic key telephone system wherein key telephone sets equipped with both tone signal generating push buttons and line pick-up keys may be employed to transmit call signaling information in digital form at the same time that the audible tones corresponding to the operated push buttons are heard by the station user. In this manner, although the call signaling information is transmitted to the call signaling register of the local intercom network in digital form, the identity of the operated pushbutton will be conveyed to the station user since he will hear the same audible tones when the push buttons are used to designate an intercom station as when the push buttons are used to make a call over a central office line. The circuitry which has been discussed in connection with the illustrative embodiment represents one manner in which our invention may be implemented. Numerous other arrangements may be devised by those skilled in the art without departing from the spirit and scope of our invention.

What is claimed is:

1. In an electronic key telephone system having a plurality of key telephone sets provided with call signaling push buttons operable to generate alternating current signals representative of a called number digit, a plurality of line pick-up keys and a station set shift register having inputs adapted to receive the encoded identity of any operated one of said pick-up keys, each of said telephone sets being provided with a data link connection to said station set shift register, the combination comprising:

means for encoding the identity of an operated one of said call signaling push buttons into a form suitable for entry into said station set shift register, means responsive to the operation of said one of said push buttons for connecting said encoding means to said shift register, means for isolating said shift register from said data link connection during the operation of said push button, and means responsive to said alternating current signals for reproducing audible signal tones corresponding to a called number digit, said audible signal tones informing a station set user of the operation of one of said push buttons.

2. In an electronic key telephone system according to claim 1 the combination wherein said means for encoding the identity of said operated one of said call signaling push buttons comprises a plurality of contacts connected to said push buttons, a predetermined number of said contacts being actuated when one of said push buttons is operated, and means for connecting predetermined ones of said contacts to said inputs of said station set shift register.

3. In an electronic key telephone system according to claim 2 the combination wherein said station shift register comprises a plurality of stages and wherein said means for connecting predetermined ones of said contacts to said shift register comprises a plurality of gate elements, said gate elements having outputs connected to said stages of said station set shift register and inputs connected to said predetermined ones of said contacts.

4. In an electronic key telephone system according to claim 1 the combination further comprising means for receiving signals over said data link connection and means controlled by said signal receiving means for transferring the contents of said station set shift register to said data link.

5. In an electronic key telephone system according to claim 4 the combination wherein said means for isolating said shift register from said data link connection includes means for inhibiting said means controlled by said signal receiving means.

6. In a key telephone system including a plurality of key telephone sets, station modules, intercom modules, an intercom switching network and a call signaling register for controlling said network, each of said station sets including alternating current signal generating push buttons and a station set shift register, each of said station sets having an audio speech path and being connected to a respective station module by a data link, the combination comprising:

means controlled by the operation of one of said station set pick-up keys for establishing a path including said data link from said station set to said call signaling register, means for converting said alternating current signals into audible tone signals, said tone signals being applied to said speech path, means for entering binary signals identifying a subsequently operated one of said alternating current signal generating push buttons into said station set shift register, and means for outpulsing the contents of said station set shift register over said data link to said call signaling register.

7. A key telephone system according to claim 6 wherein said path from said station set to said call signaling register includes a bare collector NAND gate at one of said intercom modules and at one of said station modules, a conductor interconnecting the output of each said bare collector NAND gate, and means for controlling the state of at least one said NAND gate to transmit information from its associated one of said modules to the other of said modules.

8. A key telephone system according to claim 6 further comprising means associated with said call signaling register for examining predetermined sets of said binary signals, a source of clock signals connected to said call signaling register for advancing said binary signals into said call signaling register, means controlled by said examining means for inhibiting said clock signals when predetermined sets of said binary signals are detected, and means for completing a connection through said intercom switching network responsive to said predetermined signals being registered in said call signaling register.

9. In an electronic key telephone system having key telephone sets provided with alternating current signal generating push buttons and a plurality of line pick-up keys, the combination comprising:

a shift register in each of said station sets, means for entering into said shift register binary information for identifying an operated one of said line pick-up keys, a translation field interposed between said alternating current signal generating push buttons and said shift register for entering into said register a set of binary signals representing an element of call signaling information corresponding to alternating current signals generated by an operated one of said push buttons, and means responsive to alternating current signals generated by an operated one of said push buttons for reproducing audible signal tones corresponding to a called number digit, said audible signal tones informing a station set user of the operation of said push buttons.

10. In an electronic key telephone system the combination according to claim 9 wherein each of said telephone sets includes a data link connection to said station set shift register, the combination further comprising a local intercom network, a plurality of central office lines, means remote from said station set and controlled by information received over said data link for directing said tone signals over one of said central office lines when one of said pick-up keys is operated, and means for directing said binary pattern to said local intercom network when another of said pick-up keys is operated.

11. A key telephone system according to claim 7 wherein said means for controlling the state of one said NAND gate includes a multiplexer at said one of said modules.

12. A key telephone system according to claim 11 wherein said multiplexer is adapted to receive information transmitted over said conductor from the output of the other said NAND gate.

13. A key telephone system according to claim 6 wherein said path from said station set to said call signaling register includes:

a station data register associated with one of said station modules for receiving information from said station set, a multiplexer associated with one of said intercom modules for receiving information from said call signaling register, a bare collector NAND gate associated with said one of said station modules and controlled by said station data register, a bare collector NAND gate associated with said one of said intercom modules and controlled by said multiplexer, and a conductor interconnecting the output of each bare collector NAND gate for the transmission of information between said station data register and said multiplexer.

* * * * *